US008751952B2

(12) United States Patent
Nestler et al.

(10) Patent No.: US 8,751,952 B2
(45) Date of Patent: Jun. 10, 2014

(54) DATAFLOW-DRIVEN SERVICE COMPOSITION AT THE PRESENTATION LAYER

(75) Inventors: Tobias Nestler, Dresden (DE); Andreas Pursche, Dresden (DE)

(73) Assignee: SAP AG, Walldorf (DE)

( * ) Notice: Subject to any disclaimer, the term of this patent is extended or adjusted under 35 U.S.C. 154(b) by 283 days.

(21) Appl. No.: 12/620,795

(22) Filed: Nov. 18, 2009

(65) Prior Publication Data

US 2011/0119618 A1    May 19, 2011

(51) Int. Cl.
    G06F 3/048    (2013.01)
(52) U.S. Cl.
    CPC ..................................... *G06F 3/048* (2013.01)
    USPC .......................................... 715/781; 719/320
(58) Field of Classification Search
    USPC ............................. 719/320; 715/760; 709/315
    See application file for complete search history.

(56) References Cited

U.S. PATENT DOCUMENTS

| 2003/0188039 | A1* | 10/2003 | Liu et al. ........................ 709/315 |
| 2004/0030993 | A1* | 2/2004 | Hong Huey et al. .......... 715/513 |
| 2006/0228654 | A1 | 10/2006 | Sanjar et al. |
| 2009/0187836 | A1* | 7/2009 | Owen et al. .................... 715/760 |
| 2009/0199213 | A1* | 8/2009 | Webster et al. ................ 719/320 |
| 2009/0235187 | A1* | 9/2009 | Kim et al. ...................... 715/760 |

FOREIGN PATENT DOCUMENTS

WO    WO2009058740 A2    5/2009

OTHER PUBLICATIONS

European Search Report for Application No. 10 014 627.3 dated Jun. 29, 2011, 8 pages.
F. Daniel et al., "Understanding UI Integration: A Survey of Problems, Technologies, and Opportunities," Internet Computing, vol. 11, Issue No. 3, May/Jun. 2007, pp. 59-66.
V. Hoyer et al., "Market Overview of Enterprise Mashup Tools," *Lecture Notes in Computer Science;* vol. 5364, Proceedings of the 6th International Conference on Service-Oriented Computing, Sydney, Australia, 2008, pp. 708-721.
J. Yu et al., "Mixup: A Development and Runtime Environment for Integration at the Presentation Layer," Proceedings of the Seventh International Conference on Web Engineering (ICWE'07), LNCS, vol. 4607, Jul. 2007, Springer Verlag, Como, Italy, pp. 479-484.
T. Nestler et al., "Service Composition at the Presentation Layer using Web Service Annotations," ComposableWeb'09 Workshop in conjunction with Proceedings of Ninth International Conference on Web Engineering (ICWE'09), Jun. 23, 2009, San Sebastian, Spain, pp. 63-68.

(Continued)

*Primary Examiner* — Ryan Pitaro
*Assistant Examiner* — Tuan S Nguyen
(74) *Attorney, Agent, or Firm* — Fish & Richardson P.C.

(57) ABSTRACT

Implementations of computer-implemented methods include retrieving a plurality of web services, displaying a plurality of user interfaces, each user interface corresponding to one of the plurality of web services, receiving a first user input indicating an interaction element of a first user interface of the plurality of user interfaces, indicating one or more interaction elements of a second user interface of the plurality of user interfaces based on the first user input, receiving a second user input indicating a selection of one of the one or more interaction elements of the second user interface, automatically generating a dataflow between the interaction element of the first user interface and the one of the one or more interaction elements of the second user interface in response to receiving the second user input, and modeling the application based on the dataflow.

18 Claims, 13 Drawing Sheets

(56) References Cited

OTHER PUBLICATIONS

T. Nestler et al., "User-Centric Composition of Service Front-ends at the Presentation Layer," Proceedings of the First International Workshop on User-Generated Services, Stockholm, Sweden, Nov. 24, 2009, 10 pages.

Yahoo Pipes [retrieved May 18, 2010], http://pipes.yahoo.com/pipes/.

Microsoft FrontPage [retrieved May 18, 2010], http://www.microsoftfrontpage.com/.

C. Janiesch et al., "Extending Services Delivery with Lightweight Composition," *Lecture Notes in Computer Science,* vol. 5176, Proceedings of the Web Information Systems Engineering—WISE 2008 Workshops, Auckland, New Zealand, Sep. 1-4, 2008, pp. 162-171.

\* cited by examiner

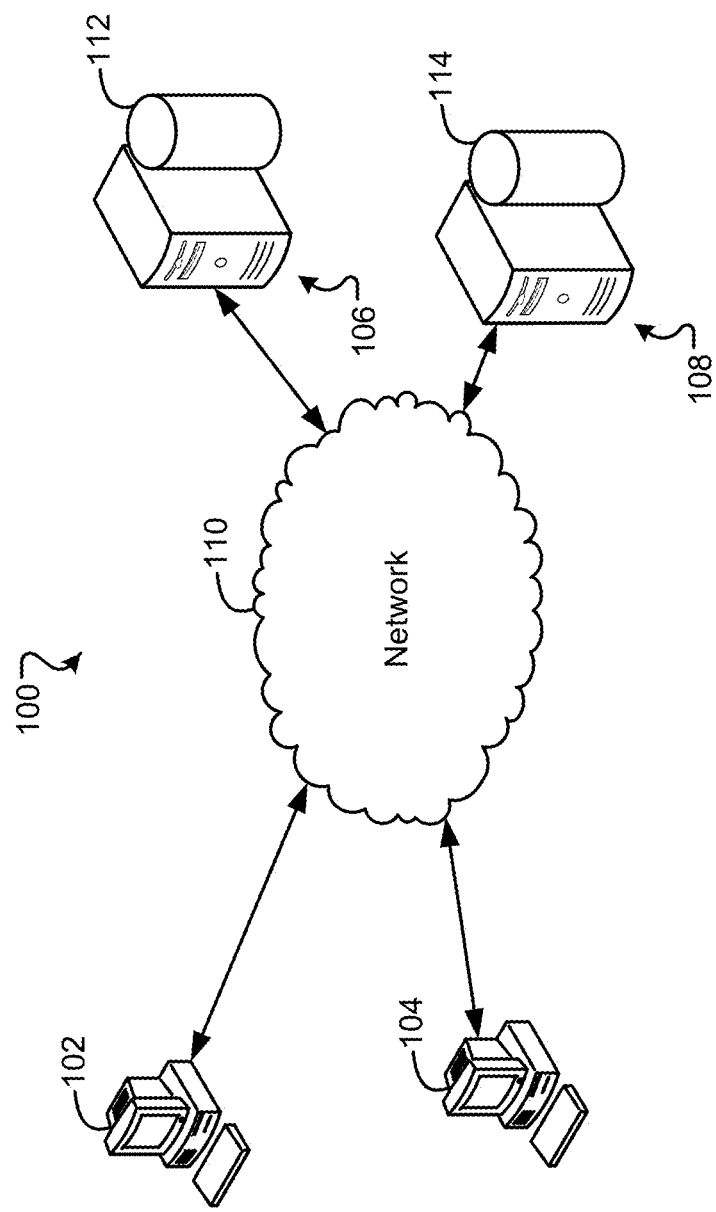

DATAFLOW-DRIVEN SERVICE COMPOSITION AT THE PRESENTATION LAYER

BACKGROUND

The emergence of web services in Service-Oriented Architectures (SOA) within companies and the global Internet may provide access to new methods for creating web applications. Typically, information technology (IT) personnel (e.g., developers and/or business process experts) use SOA and development tools to create applications for end users. The introduction of Web 2.0 offers users the capability to take part in the development of the world wide web. Non-technical users are able to create web pages in forms such as blogs or customized web pages to serve their daily needs.

SUMMARY

Implementations of the present disclosure provide computer-implemented methods for modeling an application comprising a plurality of services. In some implementations, a method includes retrieving a plurality of web services from a computer-readable repository, displaying a plurality of user interfaces on a display of a device that is in communication with the computer-readable repository, each user interface corresponding to one of the plurality of web services, receiving a first user input indicating an interaction element of a first user interface of the plurality of user interfaces, indicating one or more interaction elements of a second user interface of the plurality of user interfaces based on the first user input, receiving a second user input indicating a selection of one of the one or more interaction elements of the second user interface, automatically generating a dataflow between the interaction element of the first user interface and the one of the one or more interaction elements of the second user interface in response to receiving the second user input, and modeling the application based on the dataflow.

In some implementations, the method further includes displaying a context menu in response to receiving the first user input, the context menu comprising one or more user-selectable contexts, and receiving a third user input indicating a selection of one of the one or more user-selectable contexts, wherein indicating the one or more interaction elements of a second user interface is based on the one of the one or more user-selectable contexts.

In some implementations, the method further includes determining a data type of the interaction element of the first user interface, and determining the one or more interaction elements of the second user interface based on the data type.

In some implementations, the method further includes indicating one or more interaction elements of a third user interface of the plurality of user interfaces based on the first user input.

In some implementations, the interaction element of the first user interface corresponds to an output value that is provided as an input value to the one of the one or more interaction elements of the second user interface.

In some implementations, the interaction element of the first user interface corresponds to an input value that is provided as an input value to the one of the one or more interaction elements of the second user interface.

In some implementations, the method further includes displaying a list of available user interfaces, and receiving user inputs respectively indicating a selection of the first user interface and the second user interface to be displayed.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. In some implementations, the system includes a computer-readable repository, and one or more processors that are in communication with the computer-readable repository and that execute instructions to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 is a schematic illustration of an exemplar system architecture in accordance with implementations of the present disclosure.

Like reference symbols in the various drawings indicate like elements.

DETAILED DESCRIPTION

Figure 2A:
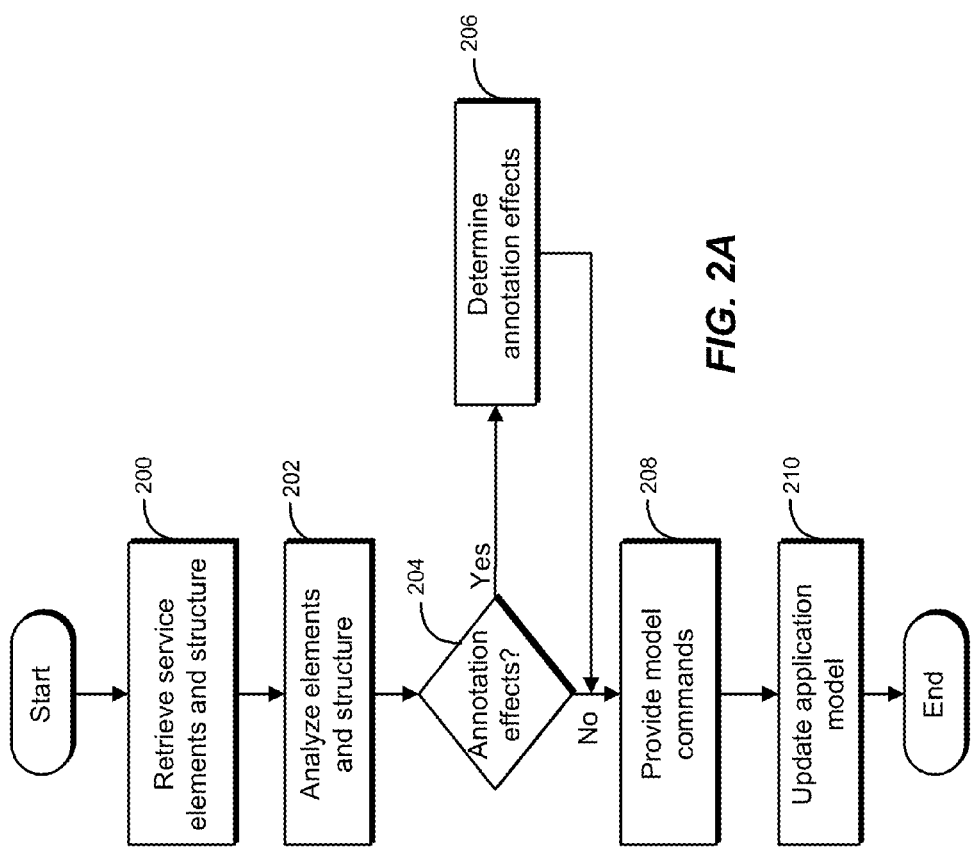
FIG. 2A is a flowchart illustrating exemplar steps that can be executed in accordance with implementations of the present disclosure.

The present disclosure is generally directed to dataflow-driven service composition at a presentation layer. More specifically, implementations of the present disclosure can provide a user-centric design approach to model and create simple service-based applications in a graphical manner. A user is able to model web service applications by defining data flows between form-based representations of web service operations without having to write programmatic code. For example, a user can create a new web service utilizing two or more separate web services using a graphical tool, rather than a programmatic tool to create the new service. As another example, a user can model an application by graphically connecting one or more user interface elements of one or more front ends of web service applications. In addition, the user may model an application having multi-page functionality, such as tabbed web service applications within one application. As an advantage, the user is not required to understand specific programming models, languages, or structure.

Referring now to FIG. 1, a block diagram of an exemplar system architecture 100 that can be used to execute implementations of the present disclosure is illustrated. The architecture 100 may represent any client/server system that spans one or more networks. In one example, the architecture 100 represents a web service composition architecture 100 that can generate WYSIWYG ("What You See Is What You Get") type web service applications and provide the applications to one or more users. For example, the architecture 100 may employ techniques to combine web services into one web service application and to provide the application for execution on one or more systems.

In some implementations, the architecture 100 may represent a client/server system supporting multiple computer systems including a client 102, a client 104, and/or one or more servers 106 and 108 that are connectively coupled for communication with one another over a network 110. In some implementations, the clients 102, 104 may be directly connected to the servers 106 or 108 (without connecting via network 110).

The clients 102, 104 are intended to represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 102, 104 may access application software and/or web services provided by server system 106 and/or server system 108.

The server systems 106, 108 are intended to represent various forms of servers including, but not limited to a web server, an application server, a proxy server, a network server, a server farm, etc. The server system 106 can, for example, be provided as an application server that executes software accessed by client computers 102, 104. The software can include predefined and/or user designed web service applications with web service operations being represented by form-based front ends that are used during the design of the application. In some implementations, the applications may be composed at design time to model the web service application, to define data flow between web service operations, and to provide a concrete view of the web service application as the service may appear at runtime.

In operation, multiple clients (e.g., clients 102, 104) can communicate with server system 106 or server system 108 via network 110. In some implementations, a user can invoke applications and/or web services available from the server system 106 in a web browser running on client 102, 104. Each application can individually access data from a number of repository resources. For example, the server system 106 can access one or more repositories 112 and similarly, the server system 108 can access one or more repositories 114. Data repositories 112 and 114 can store preconfigured web service applications and/or user designed web service applications.

By way of a non-limiting example, a user can create an application using client device 102, which communicates with system 106. The system 106 can be a repository that stores a number of preconfigured web services. Once the user generates a new application, the new application can be stored and executed on either system 106, or another system (e.g., system 108). In some implementations, another user can interact with the new application through device 104, for example, where the new application is stored and executed on system 106 and/or system 108.

In some implementations, the client devices 102, 104 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver (not shown). In addition, short-range communication may occur, such as using a Bluetooth, WiFi, or other such transceiver.

In some implementations, the architecture 100 can be a distributed client/server system that spans one or more networks such as network 110. The network 110 can be provided as a large computer network, such as a local area network (LAN), wide area network (WAN), the Internet, a cellular network, or a combination thereof connecting any number of mobile clients, fixed clients, and servers. In some implementations, each client (e.g., clients 102, 104) can communicate with the server systems 106, 108 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

Referring now to FIG. 2A, a flowchart illustrates exemplar steps that can be executed in accordance with implementations of the present disclosure. In particular, the steps can be executed to model a web-based application that includes a plurality of web services during the design time of the application development process. The exemplar steps of FIG. 2A may be implemented using software instructions stored in a computer-readable storage medium and executed by a processing system including one or more processors. The exemplar steps can, for example, be performed in the environment 100, the clients 102 or 104, and/or servers 106 or 108.

In some implementations, services and operations associated with services may be represented by service front ends (e.g., user interfaces). A user interface can include a service operation with a nested container structure. The nested container structure typically includes a root operation container and an interaction container for receiving input parameters and providing output parameters of a web service. The interaction containers can determine a visualization of particular operation parameters that are used to invoke the service.

The user can retrieve information from a service description and/or other service related annotations. Information gained from a service description and description annotations can be used to create a user interface. The user interface is typically a user interface for a specific service operation. The user (e.g., functioning as a service composer and application designer), interacts with these user interfaces to create a desired application in a WYSIWYG principle. In general, no technical knowledge about service composition is required to build an application using the techniques described herein. Consequently, the user can model and layout an application in a graphical way without having to write programmatic code.

An exemplar application may provide several displayable pages that can be connected with each other to define a navigation flow from conception to the final application. Each page acts as a container for the user interfaces and represents a dialog visible on a user's screen.

In step 200, the service elements and corresponding structure are retrieved from a repository (e.g., a computer-readable storage device). In some implementations, web service data can be retrieved from a local service repository. The services and operations can be presented to a user in a service browser. A service browser is typically displayed as a window, from which a user can select web service elements (e.g., email service, flight booking service, hotel booking service, weather service, etc.) and service operations (e.g., search flight, flight booking, etc.).

Elements and structure provided by one or more services can be analyzed in step 202. By way of one non-limiting example, an inference engine (not shown) can be implemented to parse a particular model that represents the web service. In general, an inference engine is provided as a computer program that derives answers from a knowledge base. In implementations of the present disclosure, an inference engine can analyze particular service elements and operations provided by a service description (e.g., WSDL). The inference engine can generate user interface elements for each service element requested for display within a particular user interface. The inference engine can use a number of data points to infer which user interface element should be used for a specific service element. For example, the inference engine may use a parameter type (e.g., input or output), a base data type, data type enhancements and restrictions, and/or occurrence definitions.

The inference engine may be equipped to handle complex data types. Complex data types may require special consideration, because the complexity may include data types that are arbitrarily nested or recursive in nature. By way of one non-limiting example, the inference engine may not follow recursions arbitrarily to avoid infinite loops, but rather can abort further inspection after a certain number of loops. By way of another non-limiting example, input parameters having complex data types may be represented by a nested structure with the complex type divided into its child elements. It is contemplated that the web service models can be parsed in any other manner including, but not limited to, parsing during manual creation of the user interfaces.

In some implementations, output parameters that have complex data types may be presented by tables as standard output format or lists. Depending on the depth of a nested complex type, the table may contain an expanded mode to depict complex child elements. Minimum and maximum occurrences are taken into consideration by redundantly displaying the data type element or allowing multi selection in the range of the occurrence.

In step 204, it is determined whether annotation effects exist. Annotation effects represent annotated services that act as the foundation for designed applications. The annotations are reusable information fragments attached to each service description (e.g., WSDL, WADL), which are typically not available for an application developer or service composer. The annotations can be created by the service developer and stored in an annotation model based on a predefined metamodel. Annotations provide extensive additional information covering the visual appearance of a service, the behavior of user interface elements, and relations between services to further improve the visual appearance of the resulting composite application.

If annotation effects exist, which annotation effects exist are determined in step 206. Whenever the inference engine detects annotations attached upon a service element, the engine may request a description for each annotation, which specifies the effects of this particular annotation. Possible effects can include, but are not limited to, the creation of additional user interface elements, the addition and/or change of user interface element properties, the change of the appearance of user interface elements, and the restriction to a set of valid values. An annotation effect determination component of the inference engine can generate a description object for the annotation. The inference engine can analyze the description and include the effects of the annotation in its analysis process.

If it is determined that annotation effects do not exist, model commands are provided in step 208. Each command may represent a predefined change requests to an underlying application model. This application model represents the current state of the application during the design time. In general, the inference engine may select the appropriate model commands depending on predefined rules. The execution may affect the current state of the application model by integrating new elements or changing existing ones, for example. Consequently, the application model can be updated in step 210.

Figure 2B:
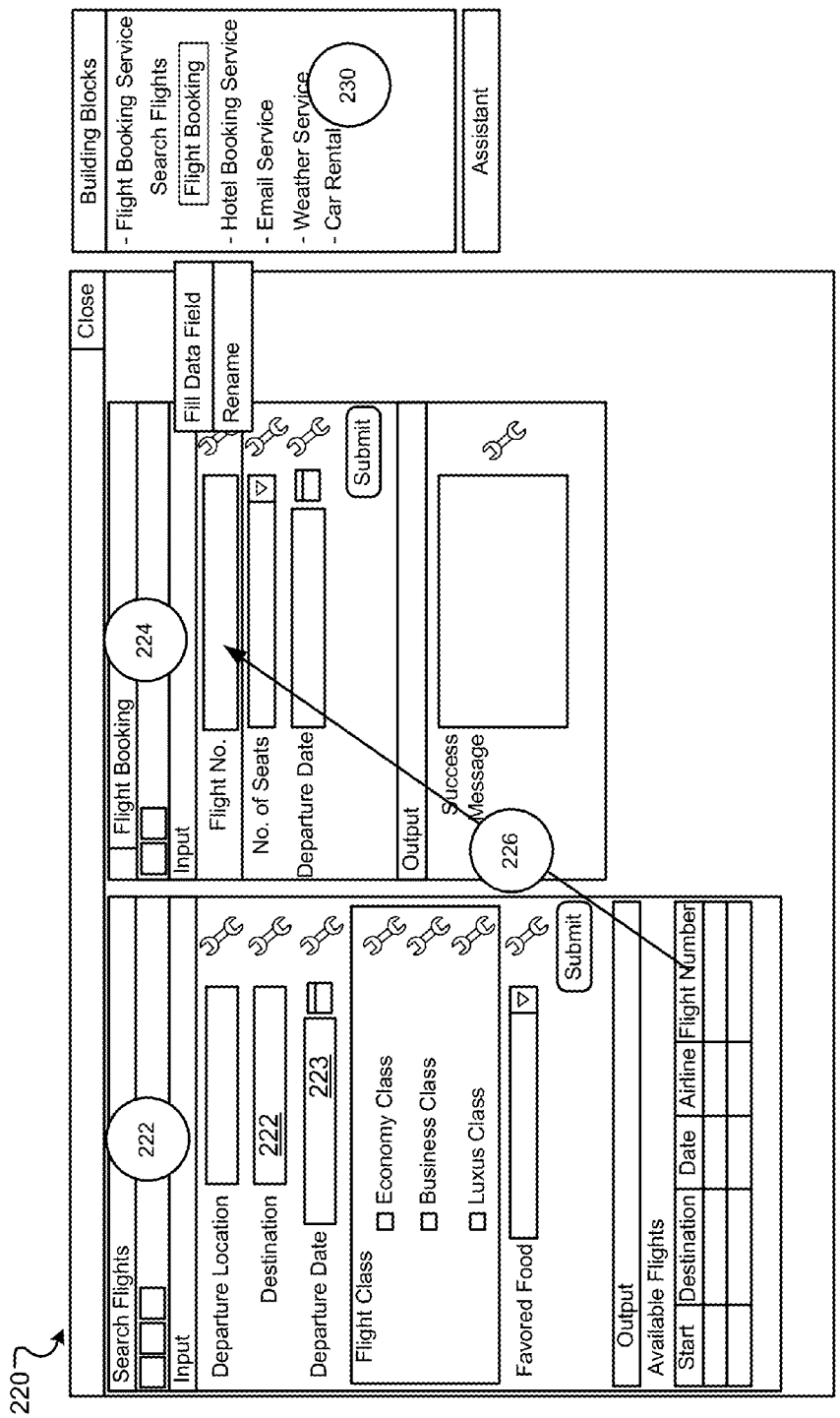
FIG. 2B is an exemplar screen-shot of a user interface builder implementing the steps in FIG. 2A.

Referring now to FIG. 2B, a screen-shot of an exemplar a web-based authoring tool 220 is depicted. The tool provides a way for a user to model an application using user interface front ends without having to create programmatic code. A front end is a user interface for defining an abstraction of underlying components which provide a user-friendly interface. In some implementations, front ends may represent services and operations of those services. The front end may include user interface elements for each input parameter, such as a button to call a service and resulting user interface elements for providing expected outcome of receiving the service.

By way of a non-limiting example, a flight search operation is modeled in the authoring tool 220. Here, the user interfaces include a search flights user interface 221 and a flight booking interface 224. The flight search operation includes input areas to search available flights (e.g., "Departure Location," "Destination," "Departure Date"). One input area 222 includes a destination with the data type of "string," while another input area 223 includes a departure date with the data type of "date." The return value may be a complex type containing the data type elements "Flight Number", "Airline", and "Price" all of which are defined as "string" data types.

Continuing with the above example, an inference engine can be implemented to generate a container structure that includes an operation root group, an input group, and an output group. In addition, both input and output parameters may be inferred. Because the destination parameter is defined as a "string" data type, a textbox is chosen as the user interface element, whereas the departure date is defined as a "date" data type and therefore it can be visualized by a calendar widget. For the output parameter as a complex type, a structured output (e.g., a table) can be chosen to display the results.

In some examples, the authoring tool 220 determines annotation effects between two different applications. Namely, the authoring tool 220 determines annotation effects between the search flights user interface 221 and the flight booking user interface 224, as shown by area 226. In this example, the parameter of the destination input field 222 is predefined as a "string" data type. This data type can be used as a metric for matching other input areas having the "string" data type related to a location or destination. If two input areas share the same data type or other similar feature (e.g., location), the authoring tool 220 may provide a suggestion that the two input fields share data at some point. For example, if a particular flight is found in the search flights application, a user may wish to book that flight within the search application rather than jump to a flight booking application.

Without the influence of annotations, the destination input field 222 may be displayed as a standard textbox handling arbitrary phrases. The addition of an enumeration annotation defines a collection of valid values. In one example, valid values may include a selection of all available destination airports. To avoid false inputs, the inference engine may not select a textbox as representing the user interface element, but rather may select a combobox to restrain the input possibilities. In addition, a label annotation can be added to all parameters defining a name readable for humans. This can allow the inference engine to use the name provided by the label annotation, rather than using the parameter name from the service description that does not necessarily provide an understandable name for its elements.

The inference engine as well as the annotation effect determinations consider the formerly mentioned user interface design recommendations. These recommendations influence the choice of which user interface element is used to represent a service parameter, or change the configuration of those user interface elements. In the depicted example, the annotation effects are used to provide commands that change the underlying application model, as shown in area 230.

Particular rules may be applied for specific annotation effects. For example, one rule may include the user of a radio button group whenever there is a choice between two or three values. Another rule may include the use of a dropdown list whenever there are more than three but under twenty valid values. Other rules may include the use of textboxes, scrollbars, sorting, alphabetizing, search capabilities, and so on.

The complete design process including the integration and composition of the front ends may be supported by a web-based authoring tool. The tool may support the user in the design of multi-page applications and the composition of the service front ends. The tool may implement an internal object model which represents the current modeling state and supports the generation of executable applications for different target platforms. This model can be updated according to user changes and the model's serialization can serve as input to a "model-to-code" generation process.

FIGS. 3A-3H provide exemplar screen-shots illustrating composition of an exemplar architecture in accordance with implementations of the present disclosure. The screen-shots depicted in FIGS. 3A-3H detail a data flow between web service operations depending on the order of invocation of the web services from one or more computer-readable repositories, such as repository 114. In general, a user can define the data flow and connect particular elements to generate new combined web service applications. The following example provides the combination of a search customer web service (e.g., database search), a send message web service (e.g., email), and a track message web service (e.g., shipping tracking). In general, the screen-shots depicted in FIGS. 3A-3H may be provided in a browser-based application. However, in some implementations, another application tool can be used to generate interfaces. Users can use the application tool to generate user interfaces for each service operation.

Figure 3A:
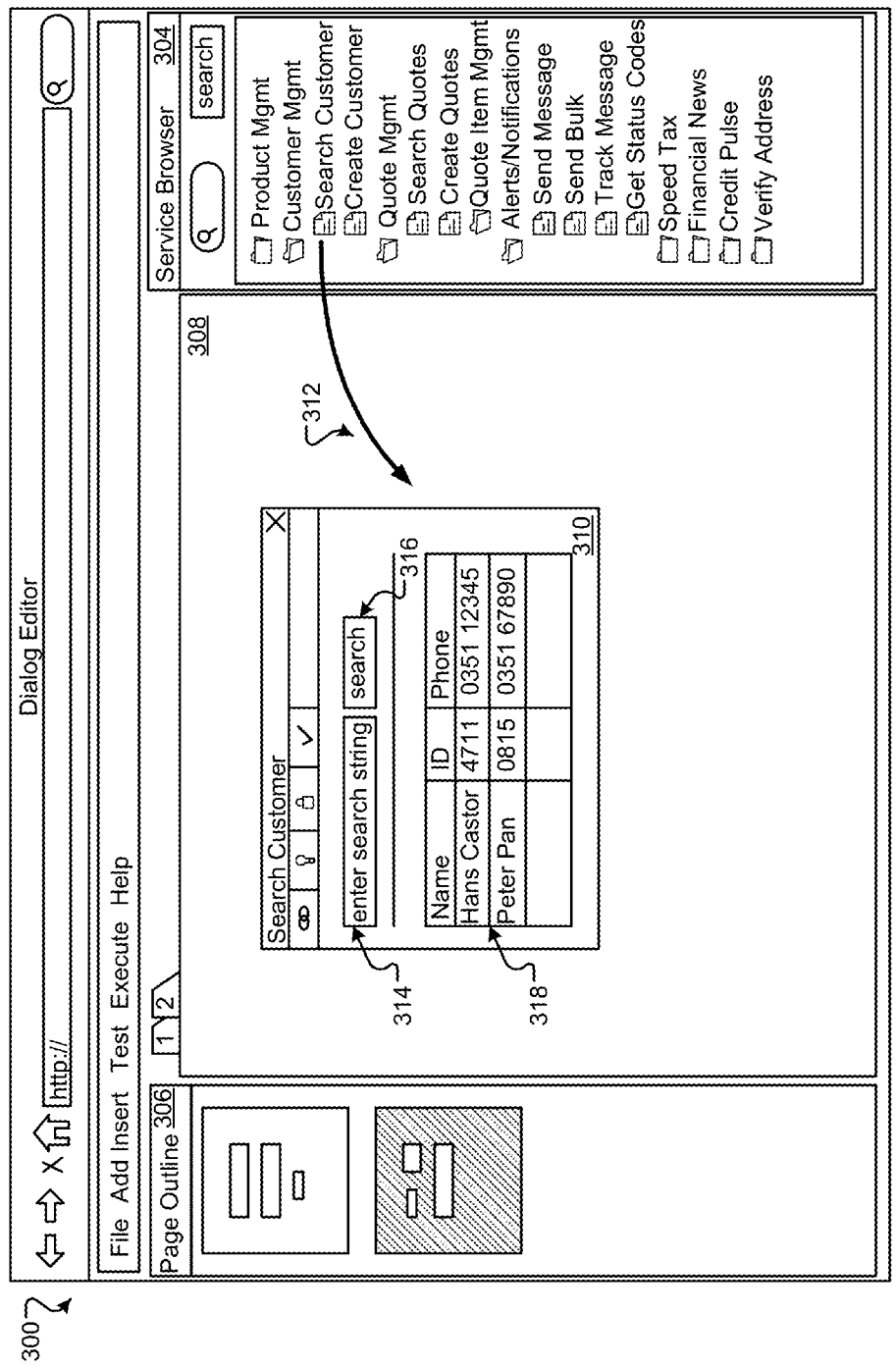
FIGS. 3A-3H provide exemplar screen-shots illustrating composition of an exemplar architecture in accordance with implementations of the present disclosure.

Referring now to FIG. 3A, an exemplar screen-shot 300 of an application tool for generating user interfaces is illustrated. One exemplar application tool is the ServFace Builder described above. The screen-shot 300 provides a service browser 304, a page outline window 306, and a working window 308. The service browser 304 functions to provide a graphical listing of available services including service operations. In this example, the service browser 304 may be created by a user who integrates services from a connected service repository. In another example, the service browser 304 may be created by a developer that can integrate multiple front ends of varying services.

The page outline window 306 can provide a thumbnail view of one or more pages of a webpage application. The working window 308 provides a view of the in progress combinations of web service applications for a particular page. In screen-shot 300, a search customer front end 310 is currently selected from the service browser 304 and appears in the working window 308. The search customer front end 310 corresponds to the search customer service, as shown by arrow 312. The search customer front end 310 includes a search box 314, a search button 316, and a table 318. The table 318 may be generated from a previously performed search within the search customer application 310.

Figure 3B:
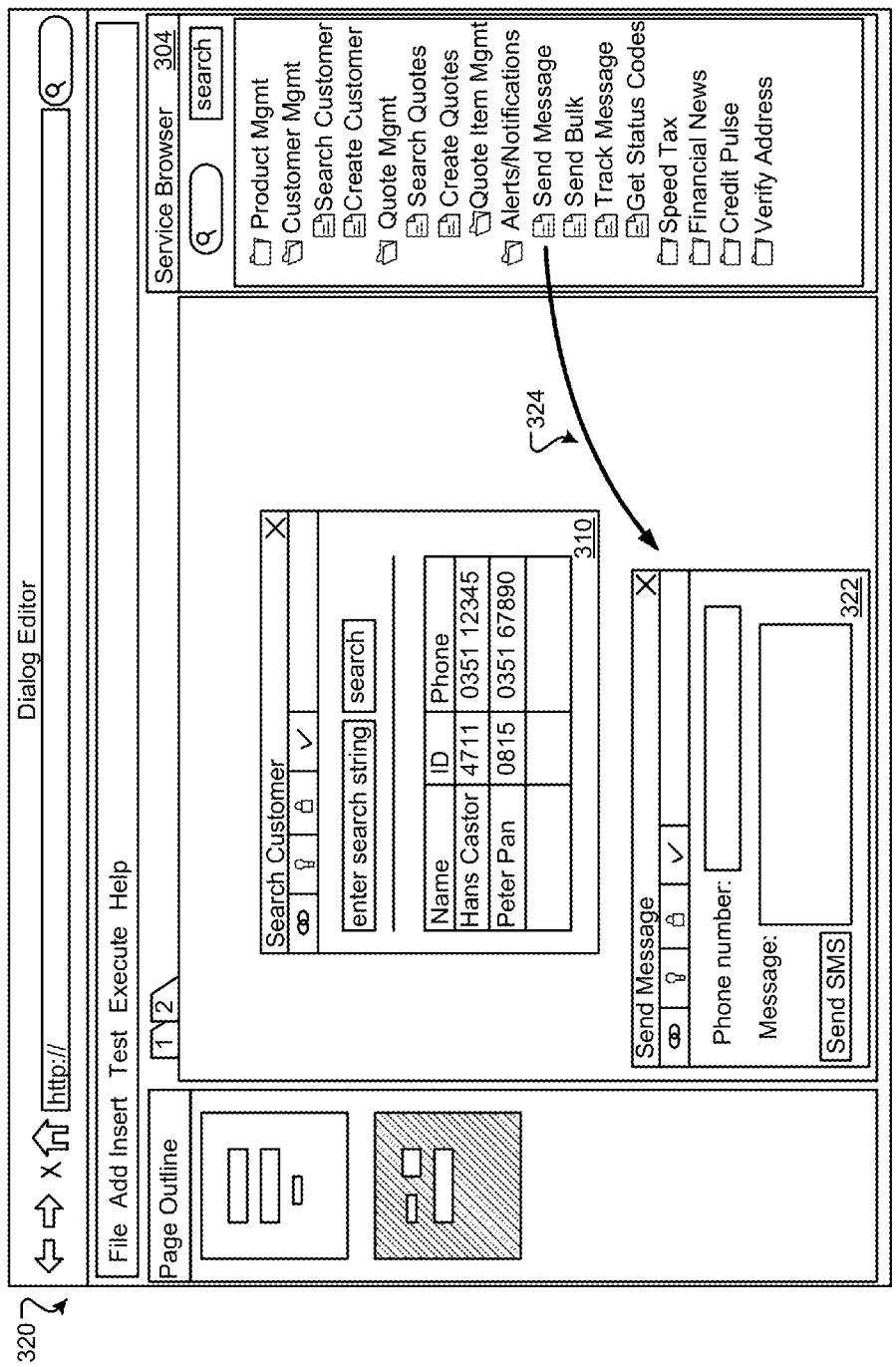
Figure 3C:
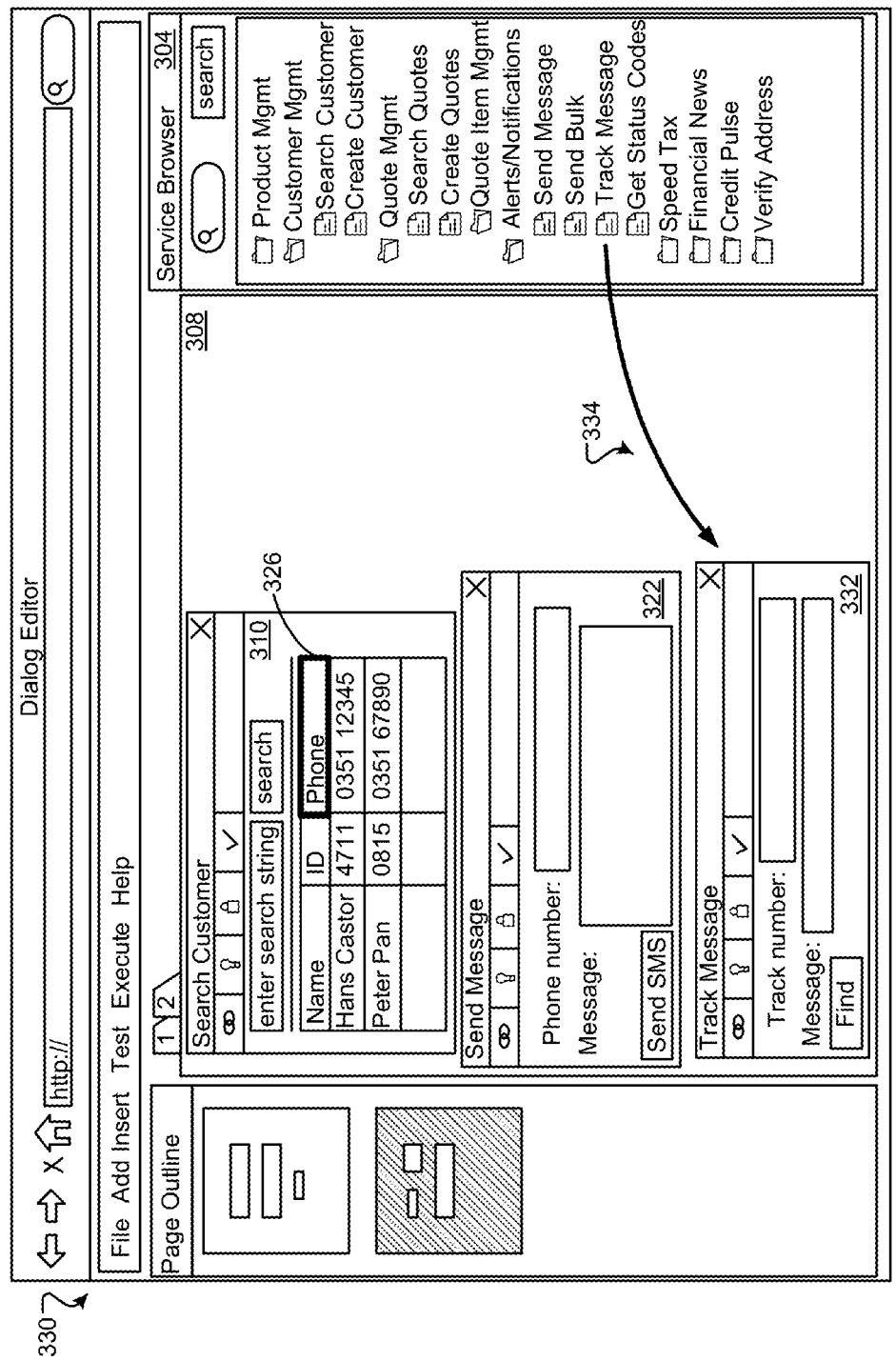

Referring now to FIGS. 3B and 3C, a screen-shot 320 of FIG. 3B is provided as an update of the screen-shot 300. More specifically, the user has selected another service from the service browser 304, as depicted by arrow 324, to provide a send message front end 322. A screen-shot 330 of FIG. 3C is provided as an update of the screen-shot 320. More specifically, the user has selected a track message service from the service browser 304, as depicted by arrow 334, to provide a track message front end 332. The working window 308 adjusts to accommodate a view of front ends 310, 322, 332. In some implementations, the working window 308 may tile, stack, or otherwise manipulate application windows for easy viewing.

Figure 3D:
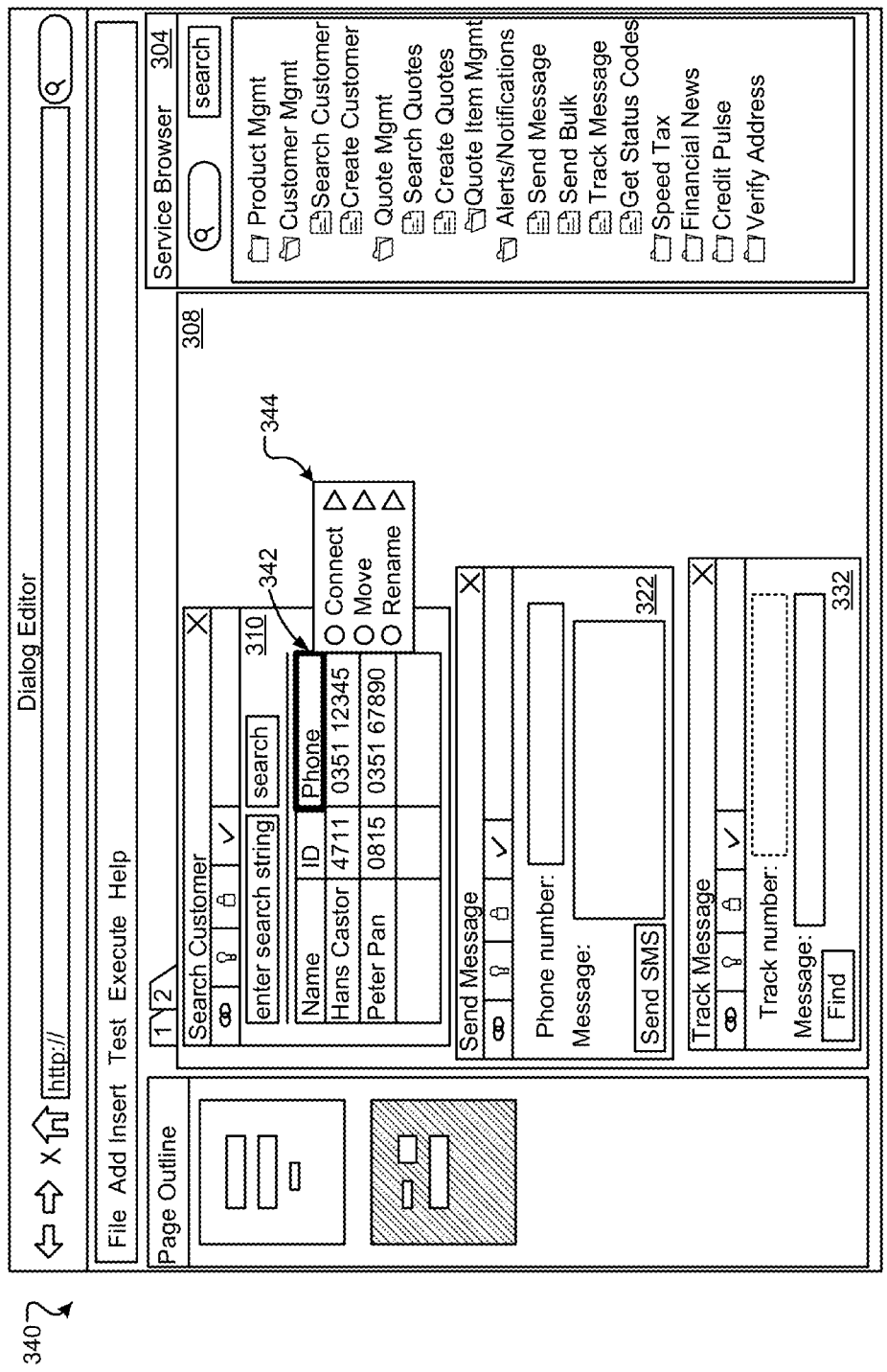

Referring now to FIG. 3D, a screen-shot 340 depicts a user selected parameter of the search customer front end 310. In the illustrated example, the user has selected the "phone" column 342 (e.g., the telephone number associated with a particular name). The application tool automatically presents a context menu 344 in response to receiving the user input selecting the phone column 342. The context menu 344 can include one or more user-selectable contexts. The user-selectable contexts are generated when, for example, a user selects a field or parameter in front end 310. The contexts may be generated based on which field or parameter is selected. For example, if the user selects the phone column 342, the context menu 344 includes options that are similarly connectable to the phone column. Specifically, the context menu 344 includes connect, move, and rename options because a phone number can be connected, moved, or renamed in any or all screens or dialog boxes.

Referring now to FIGS. 3E-3H, data flows between the displayed front ends can be defined by selecting a particular context from the context menu 344. In the exemplar screen-shot 350 of FIG. 3E, the user has selected the connect context from the context menu 344, as indicated at 352. In response to the user-selected context, the application tool automatically determines and indicates fields of the other, open front ends 322, 332 that can be linked with the selected field of the front end 310 (i.e., the phone column 342 of the exemplar illustration). The available fields of the open front ends 322, 332 can be presented to the user in a field menu. The available fields can be determined based on various approaches. By way of one non-limiting example, the available fields can be determined based on comparing data types. In this example, the application tool may search for other fields that accept integer values as inputs. In particular, the application tool can determine a data type of interaction elements of the open front ends 322, 332. For example, the selected phone column of the front end 310 can correspond to an integer data type. As a result, a drop-down list of fields of the open front ends 322, 332 that also correspond to the integer data type can be presented to the user. In the instant example, such fields can include a "phone number" field and an "ID number" field of the front end 322, and a "tracking number" field of the front end 332. In another example, the drop-down list of fields can be populated may use a complex automatic mapping algorithm. One example of a mapping algorithm may include a schema matching algorithm. The schema matching algorithm employs two schemas (e.g., service descriptions and/or WSDLs) and maps the schemas against each other for purposes of finding similarities.

Figure 3E:
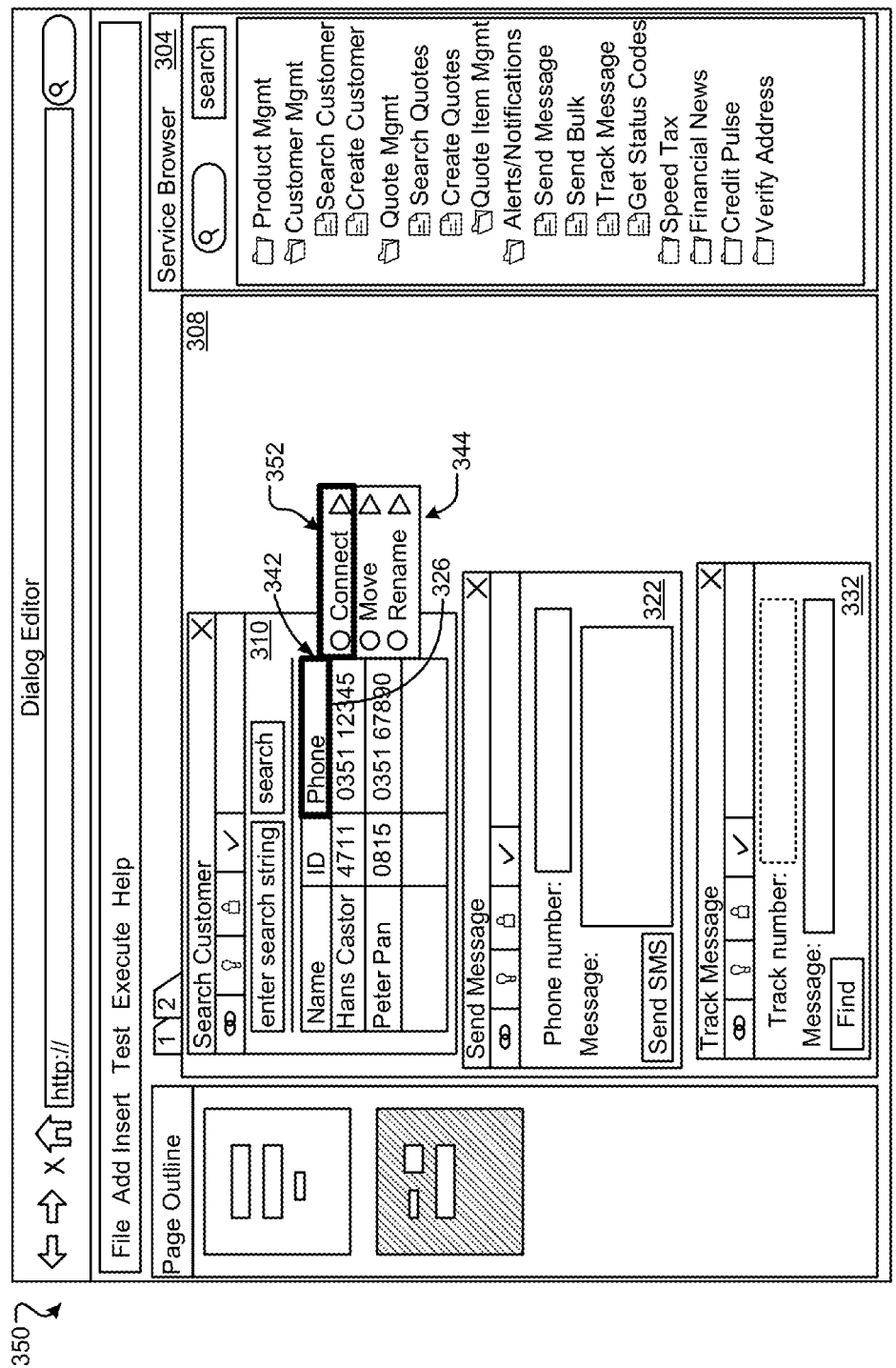
Figure 3F:
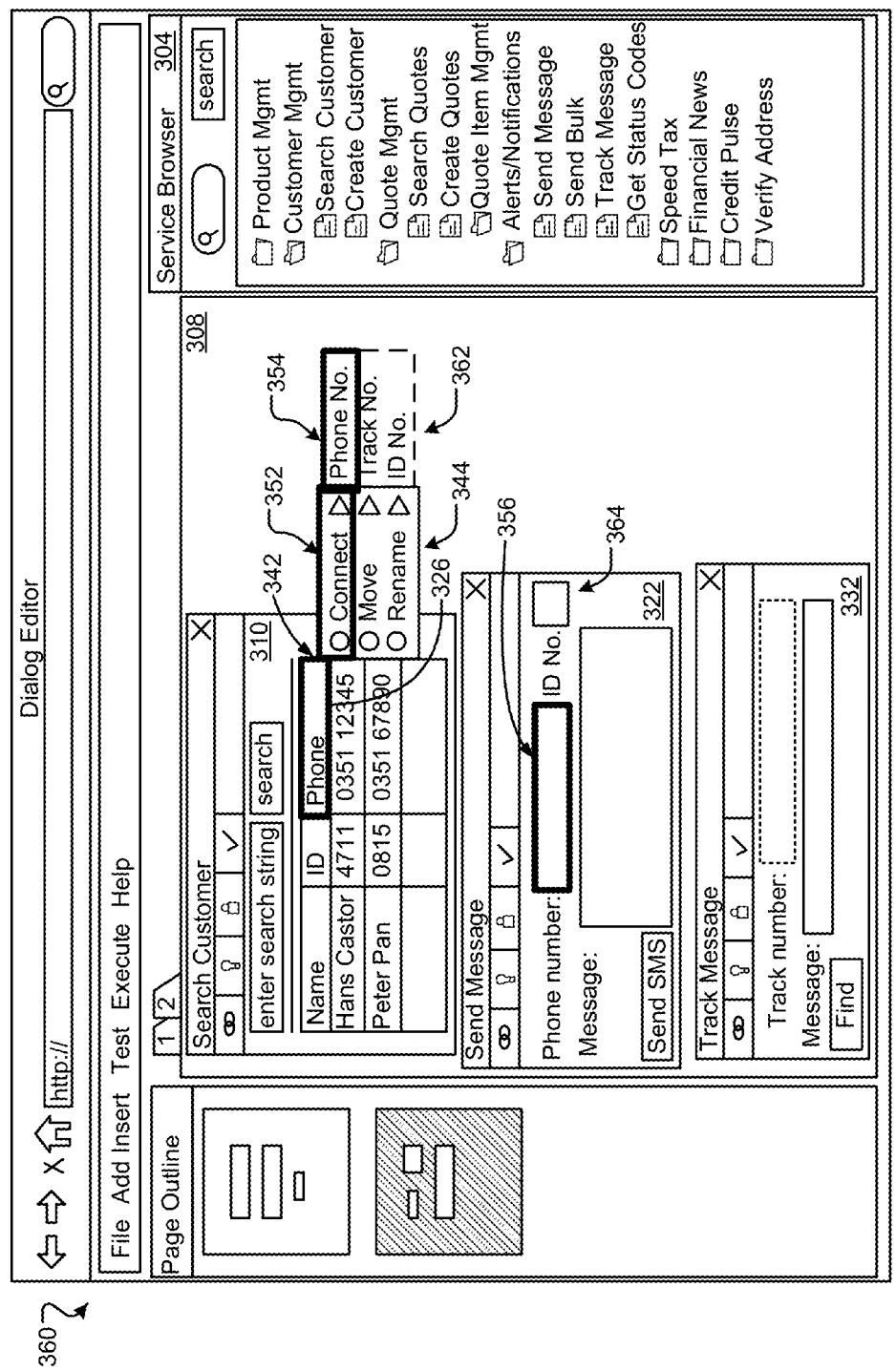
Figure 3G:
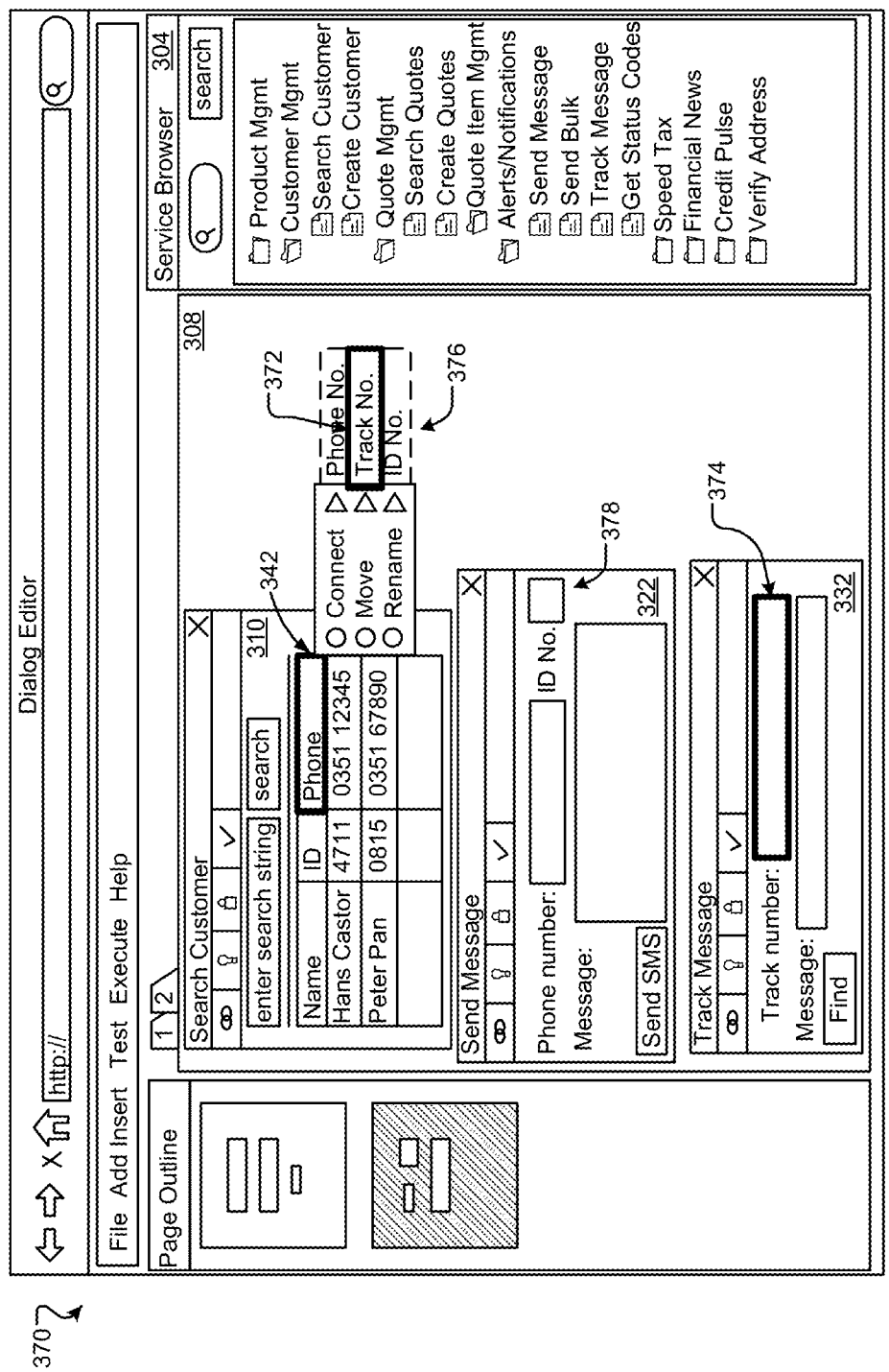
Figure 3H:
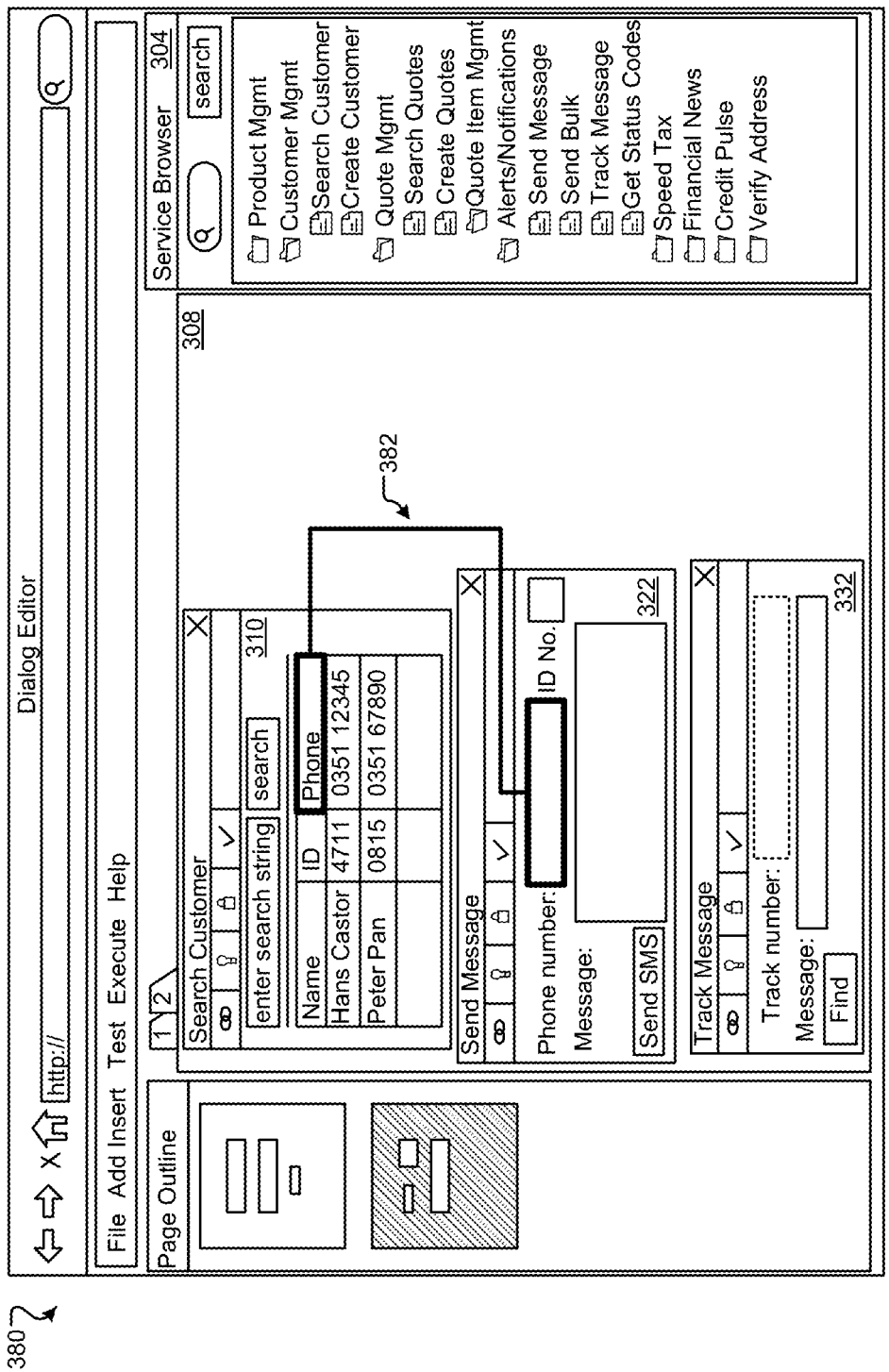

In the exemplar screen-shot 360 of FIG. 3F, a user input has been received selecting the phone number field, as indicated by 354. In response to the user selection, the application tool automatically indicates, or highlights the phone number field 356 in the send message front end 322. In the exemplar screen-shot 370 of FIG. 3G, a user input has been received selecting the track number field, as indicated by 372. In response to the user selection, the application tool automatically indicates, or highlights the track number field 374 of the track message front end 332. Although not illustrated, if a user selection is received indicating a selection of the ID number field 362 from the drop-down menu, the application tool would automatically indicate, or highlight the ID number field 364 of the send message front end 322.

A user input can be received confirming a desired connection between fields of the various front ends. In this manner, a dataflow can be defined between fields of the front ends, with one field of one front end providing an input to one or more fields of one or more other front ends. In the exemplar screen-shot 380 of FIG. 3H, a connection 382 illustrates a user-defined dataflow between the phone column of the search customer front end 310, and the phone number field of the send message front end 322. More specifically, by clicking on the suggested interaction element in context menu 344, the target of a data flow is defined and the connection 382 established (e.g., confirming the phone number field selection of FIG. 3F).

In some implementations, the user can directly select a user interface element, or data field that is graphically presented on a display rather than selecting the user interface element from a menu. More specifically, and with reference to FIG. 3G, the user can select the connect context item to invoke a connection mode. In the connection mode, the user can graphically select a data field. For example, the user can move a mouse cursor to a position over a data field of interest and select the data field. Accordingly, the user may directly select a data field in a graphically displayed front end (e.g., phone number field 356) instead of selecting the data field from a menu. It is appreciated that implementations of the present disclosure can use a menu-based approach, a graphical selection based approach and combinations thereof to define a dataflow between user interface elements of disparate web service front ends.

The definition of the dataflows can be used in various ways. For example, the definition of the dataflow may use a value of an output parameter of an operation as the input parameter for another operation in the process. In particular, if two different services include operations for searching (e.g., searching flights and searching hotels), a process can be created to provide a combined search. That is, a user can search for a flight using a constructed application, and the arrival date of a selected flight can automatically be provided as the start date for a hotel booking. In this example, the dataflow would be defined as the arrival date field of a flight search result front end providing input to a check-in field of a hotel booking front end.

In another example, the definition of the dataflow can be used to reuse a value of an input parameter of one operation as input parameter for another operation. Using the above flight and hotel search example, the user can create a process for a combined search. In such a case, a user may wish to express that the destination of the flight is also the search location of the hotel. In this example, the dataflow would be defined as the destination field of the flight search as automatically providing input for the hotel search.

While the above examples describe connecting data fields located within one user interface page, any number of pages can be accessed and connected regardless of the location of the user interface. In one example, this can be accomplished by extending a context menu in a hierarchy such that a user can select items located in fields of other user interface pages.

Figure 4:
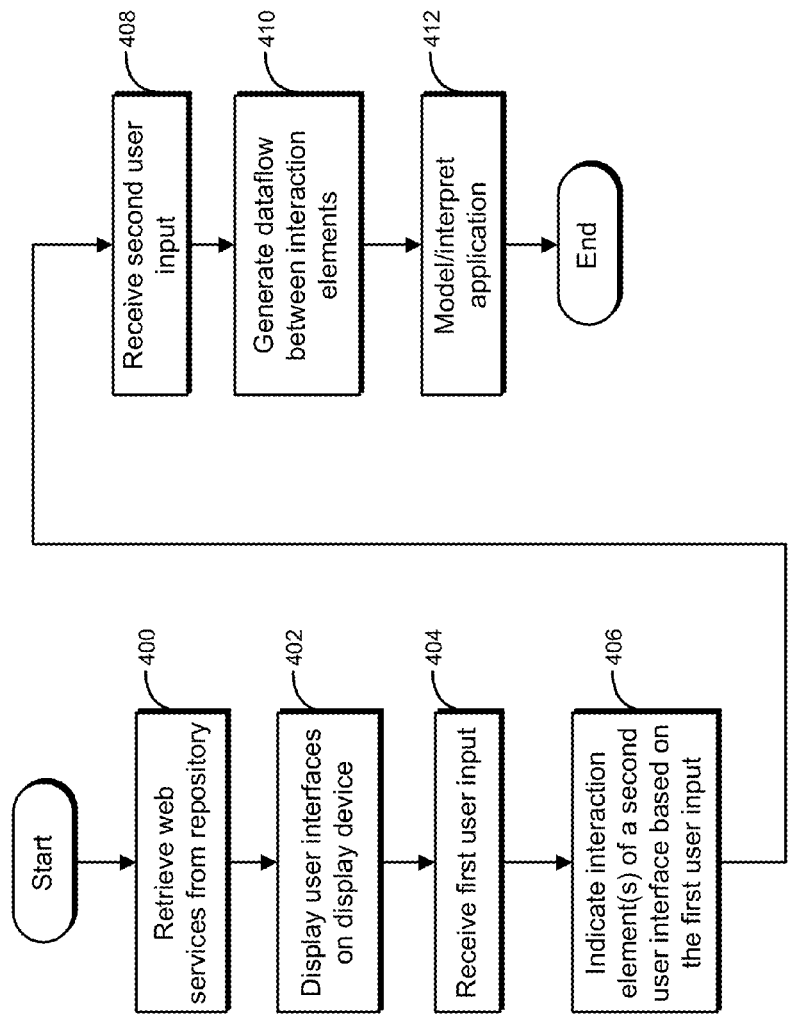
FIG. 4 is a flowchart illustrating exemplar steps that can be executed in accordance with implementations of the present disclosure.

Referring now to FIG. 4, a flowchart illustrates exemplar steps that can be executed in accordance with implementations of the present disclosure. In particular, the steps can be executed to model an application including a plurality of web services. The process shown in FIG. 4 may be implemented using software instructions stored in a computer-readable storage medium and executed by a processing system including one or more processors. The process can, for example, be performed in the environment 100, the clients 102 or 104, and/or servers 106 or 108.

In step 400, web services are retrieved from a repository. For example, the user can access the repository 114 to retrieve a plurality of web services. Referring to FIG. 3F, the plurality of web services may include the search customer service 310, the send message service 322, and the track message service 332, and/or the services listed in the service browser 304. In effect, the user selects services 310, 322, and 332, because the user intends to integrate the three user interfaces into one application environment.

In step 402, a plurality of user interfaces, or front ends, is displayed on a display device that is in communication with the computer-readable repository. Each user interface corresponds to one of the plurality of selected web services. In step 404, a first user input is received that indicates an interaction element of one of the plurality of displayed user interfaces. For example, the user can provide input indicating an interaction element of a first user interface. Referring to FIG. 3E as an example, the user can provide an input indicating a selection of the phone column 342. As discussed above, a context menu can be displayed in response to receiving the first user input. The context Menu may include one or more user-selectable contexts. For example, referring to FIG. 3F, the context menu 342 includes a connect option, a move option, and a rename option.

In step 406, one or more interaction elements of a second user interface are indicated based on the first user input. For example, the application tool can indicate a correlation between a first selected interaction element (e.g., column 342) and a similar input field in another interface (e.g., input field 356 in interface 322). In step 408, a second user input is received that indicates a selection of one of the one or more interaction elements of the other user interface. In step 410, a user defines a dataflow between user-selected interaction elements. For example, and with reference to FIG. 3G, the application tool defines a dataflow 382 between the phone column 342 and the phone number field 356 in response to receiving the second user input. In particular, the application tool uses the selected user interface elements to create a connection in the back end of the user interface. The connections result in a definition of the dataflow from service operation A to service operation B. The dataflow of the selected parameters is triggered by the execution of operation A during the runtime of the modeled application. In step 412, an application is generated and/or interpreted based on the dataflow. More specifically, a new application can be generated based on the plurality of selected frontends and the dataflow defined between user interface elements thereof. This new application can be deployed as a web-based application, for example, through which user inputs and outputs are processed in accordance with the defined dataflows. In other implementations, dataflows can be created and/or modified in an existing application.

Figure 5:
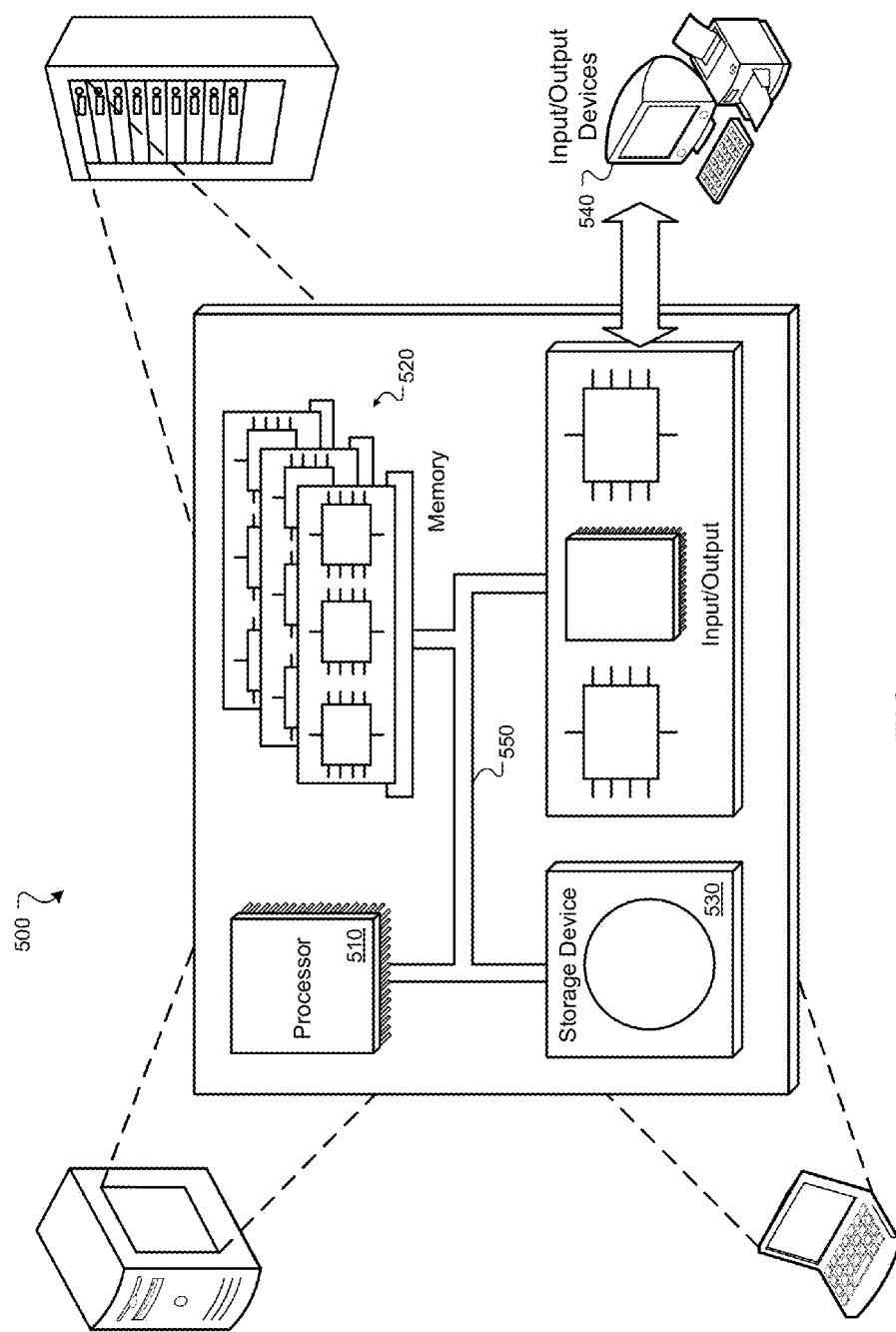
FIG. 5 is a schematic illustration of exemplar computer systems that can be used to execute implementations of the present disclosure.

Referring now to FIG. 5, a schematic illustration of exemplar hardware components 500 that can be used to execute implementations of the present disclosure is provided. The system 500 can be used for the operations described in association with the methods described herein. For example, the system 500 may be included in client systems 102 or 104 and/or server systems 106 or 108. The system 500 includes a processor 510, a memory 520, a storage device 530, and an input/output device 540. Each of the components 510, 520, 530 and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of graphical data flow modeling for generating an application based on a plurality of web services, the method comprising:
   retrieving a plurality of web services from a computer-readable repository;
   displaying a plurality of user interfaces on a display of a device that is in communication with the computer-readable repository, each user interface corresponding to one of the plurality of web services;

receiving first user input indicating selection of a first interaction element of a first user interface of the plurality of user interfaces, the first interaction element being associated with a data type;

in response to the first user input, displaying a context menu comprising one or more user-selectable contexts;

receiving a user selection of a user-selected context from the context menu, identifying, based on the user-selected context, one or more interaction elements of one or more user interfaces of the plurality of user interfaces that can be connected to the first interaction element to enable dataflow therebetween, wherein the one or more interaction elements are each associated with the data type;

graphically indicating the one or more interactions elements;

receiving second user input indicating selection of a second interaction element from the one or more interaction elements, the second interaction element being provided in a second user interface of the plurality of user interfaces;

in response to receiving the second user input, automatically generating a dataflow between the first interaction element of the first user interface and the second interactions element of the second user interface, wherein the dataflow represents a flow of data between the first interaction element and the second interaction element; and modeling the application based on the dataflow.

2. The method of claim 1, further comprising:

determining the data type of the first interaction element of the first user interface; and determining the one or more interaction elements of the one or more user interfaces of the plurality of user interfaces based on the data type.

3. The method of claim 1, further comprising indicating one or more interaction elements of a third user interface of the plurality of user interfaces based on the first user input.

4. The method of claim 1, wherein the first interaction element of the first user interface corresponds to an output value that is provided as an input value to the second interaction element of the second user interface.

5. The method of claim 1, wherein the first interaction element of the first user interface corresponds to an input value that is provided as an input value to the second interaction element of the second user interface.

6. The method of claim 1, further comprising:

displaying a list of available user interfaces; and receiving user inputs respectively indicating a selection of the first user interface and the second user interface to be displayed.

7. A non-transitory computer-readable storage medium coupled to one or more processors and having instructions stored thereon that, when executed by the one or more processors, cause the one or more processors to perform operations comprising:

retrieving a plurality of web services from a computer-readable repository;

displaying a plurality of user interfaces on a display of a device that is in communication with the computer-readable repository, each user interface corresponding to one of the plurality of web services;

receiving first user input indicating selection of a first interaction element of a first user interface of the plurality of user interfaces, the first interaction element being associated with a data type;

in response to the first user input, in response to the first user input, displaying a context menu comprising one or more user-selectable contexts;

receiving a user selection of a user-selected context from the context menu, identifying, based on the user-selected context, one or more interaction elements of one or more user interfaces of the plurality of user interfaces that can be connected to the first interaction element to enable dataflow therebetween, wherein the one or more interaction elements are each associated with the data type;

graphically indicating the one or more interactions elements;

receiving second user input indicating selection of a second interaction element from the one or more interaction elements, the second interaction element being provided in a second user interface of the plurality of user interfaces;

in response to receiving the second user input, automatically generating a dataflow between the first interaction element of the first user interface and the second interactions element of the second user interface, wherein the dataflow represents a flow of data between the first interaction element and the second interaction element; and modeling the application based on the dataflow.

8. The computer-readable storage medium of claim 7, wherein the operations further comprise:

determining the data type of the first interaction element of the first user interface; and determining the one or more interaction elements of the one or more user interfaces of the plurality of user interfaces based on the data type.

9. The computer-readable storage medium of claim 7, wherein the operations further comprise indicating one or more interaction elements of a third user interface of the plurality of user interfaces based on the first user input.

10. The computer-readable storage medium of claim 7, wherein the first interaction element of the first user interface corresponds to an output value that is provided as an input value to the second interaction element of the second user interface.

11. The computer-readable storage medium of claim 7, wherein the first interaction element of the first user interface corresponds to an input value that is provided as an input value to the second interaction element of the second user interface.

12. The computer-readable storage medium of claim 7, wherein the operations further comprise:

displaying a list of available user interfaces; and receiving user inputs respectively indicating a selection of the first user interface and the second user interface to be displayed.

13. A system, comprising:

a computer-readable repository; and one or more processors that are in communication with the computer-readable repository and that execute instructions to perform operations comprising:

retrieving a plurality of web services from a computer-readable repository;

displaying a plurality of user interfaces on a display of a device that is in communication with the computer-readable repository, each user interface corresponding to one of the plurality of web services;

receiving first user input indicating selection of a first interaction element of a first user interface of the plurality of user interfaces, the first interaction element being associated with a data type;

in response to the first user input, in response to the first user input, displaying a context menu comprising one or more user-selectable contexts;

receiving a user selection of a user-selected context from the context menu, identifying, based on the user-selected context, one or more interaction elements of one or more user interfaces of the plurality of user interfaces that can be connected to the first interaction element to enable dataflow therebetween, wherein the one or more interaction elements are each associated with the data type;

graphically indicating the one or more interactions elements;

receiving second user input indicating selection of a second interaction element from the one or more interaction elements, the second interaction element being provided in a second user interface of the plurality of user interfaces;

in response to receiving the second user input, automatically generating a dataflow between the first interaction element of the first user interface and the second interactions element of the second user interface, wherein the dataflow represents a flow of data between the first interaction element and the second interaction element; and modeling the application based on the dataflow.

14. The system of claim 13, wherein the operations further comprise:
   determining the data type of the first interaction element of the first user interface; and
   determining the one or more interaction elements of the one or more user interfaces of the plurality of user interfaces based on the data type.

15. The system of claim 13, wherein the operations further comprise indicating one or more interaction elements of a third user interface of the plurality of user interfaces based on the first user input.

16. The system of claim 13, wherein the first interaction element of the first user interface corresponds to an output value that is provided as an input value to the second interaction element of the second user interface.

17. The system of claim 13, wherein the first interaction element of the first user interface corresponds to an input value that is provided as an input value to the second interaction element of the second user interface.

18. The system of claim 13, wherein the operations further comprise:
   displaying a list of available user interfaces; and
   receiving user inputs respectively indicating a selection of the first user interface and the second user interface to be displayed.

* * * * *